Nov. 1, 1932.   S. L. VAN METER, JR   1,885,570
AIRCRAFT
Filed Aug. 2, 1929   6 Sheets-Sheet 2

Inventor
Solomon Lee Van Meter, Jr.
By
his Attorneys

Nov. 1, 1932.  S. L. VAN METER, JR  1,885,570
AIRCRAFT
Filed Aug. 2, 1929   6 Sheets-Sheet 5

Inventor
Solomon Lee Van Meter, Jr.
By
Attorneys

Nov. 1, 1932.   S. L. VAN METER, JR   1,885,570
AIRCRAFT
Filed Aug. 2, 1929   6 Sheets-Sheet 6

UNITED STATES PATENT OFFICE

SOLOMON LEE VAN METER, JR., OF WASHINGTON, DISTRICT OF COLUMBIA

AIRCRAFT

Application filed August 2, 1929. Serial No. 382,954.

This invention relates to aircraft, and particularly to an arrangement whereby, in an emergency, that portion of the machine occupied by the passengers may be landed by means of a parachute. Safety appliances, comprising parachutes, have heretofore been proposed, but an analysis of numerous aircraft accidents occurring in the last ten years shows conclusively that a very large percentage of the lives lost in those accidents might have been saved if it had been possible to reduce the time interval between the decision to abandon the craft and the time at which the parachute, in the apparatus then used, fully opened after the apparatus had been put into use in the emergency. For instance, in the use of the seat-pack or back-pack type of parachute (this type being stressed because the same has been adopted as standard equipment), there is a time interval of approximately six to eight seconds lost in unfastening the safety belt, climbing out of and jumping clear of the craft, pulling the rip cord, and in waiting about two seconds thereafter for the parachute to open.

In view of the foregoing, the primary object of the present invention is to produce a type of parachute apparatus that can be placed in operation in what is believed to be a minimum amount of time.

Another object of the invention is to provide a safety arrangement wherein the accupants of the craft are landed in the passenger carrying portion of the craft.

In the preferred form of craft, the passengers are carried in a cabin compartment, and in this instance the invention contemplates a construction of craft wherein the passenger cabin, as well as the parachute for landing the same, are sure to free or clear themselves of other portions of the craft when the latter is abandoned in an emergency. In this instance, therefore, it may be said that the invention contemplates a safety appliance in which the speed of operation is reduced to a minimum and reliability of operation is raised to what is believed to be the highest degree possible.

More specifically, this phase of the invention consists in having detachably secured below the fuselage proper of the craft, a series of compartments, a passenger compartment, a combination kitchen and lavatory or toilet compartment, and a third compartment in which is stored the main parachute and the pilot parachute, all of these compartments being so arranged with respect to the fuselage that, when the craft is falling, they may all be instantaneously released from the fuselage, the parachute ejected from its compartment, and, upon the parachute opening and offering resistance to the downward movement of the other compartments to which it is connected, said other compartments will move relatively to the fuselage in a plane substantially parallel to the line of movement of the falling craft as a whole. In other words, there are no material projections from the fuselage and no obstructions whatever to damage or interfere with the movement of the passenger compartment and toilet compartment rearwardly of the craft. These compartments being thus free to move rearwardly with respect to the fuselage in a plane substantially parallel with the direction of movement of the craft as a whole, there is no necessity of the compartments being lifted, so to speak, out of the fuselage or moved in a direction at an angle to the direction of the falling craft.

Another object consists in providing means whereby the combination of kitchen and toilet compartment may be detached from the passenger compartment proper, if desired.

A still further object is the provision of means whereby the load lines connecting the parachute with the passenger cabin may be detached from the cabin, if desired. This is important because, upon occasions after the cabin has landed on the surface of the earth, atmospheric conditions might be such that the the parachute would tend to drag the cabin along the ground. Under these circumstances, it is advantageous to be able to free the parachute from the cabin.

With these and other objects in view, the invention consists in certain details of construction and combinations and arangements of parts, all as will hereinafter be more fully described and the novel features thereof particularly pointed out in the appended claims.

In accordance with the present invention, the preferred form of craft comprises the passenger cabin 10 having an entrance door 11 and, in its interior, seats 12 similar to seats in present-day Pullman cars, in that they may be transformed into sleeping quarters. In the rear of the passenger cabin and communicating therewith, there is a compartment 13 that may be sub-divided for kitchen and toilet purposes. In the rear of this compartment 13, there is a second compartment 14, in which is carried the main parachute 15. At the forward end of cabin 10, there is seating space 16 for the pilot, giving him ready access to the various operating elements such as the rudder, throttle, and control stick, indicated at 17. Both pilot and relief pilot are fastened in their seat by means of safety belts. Connections 18 for the rudder are also shown extending from the compartment at the forward end of the craft to the rear end thereof. The supporting surfaces for the craft are wings 20 and the rudder and stabilizer are indicated at 21, 21a, respectively, but as these portions of the craft may be of any design, a detailed illustration thereof is not deemed necessary, nor need a further description thereof be given herein.

As above outlined, upon the aircraft getting out of control and falling, it is desirable that the passenger carrying cabin be capable of moving rearwardly of the falling fuselage upon being freed therefrom and its movement retarded by parachute 15. For this reason, cabin 10 and the compartments 13 and 14, which normally constitute obstructions in the rear of said cabin, are all detachably secured to the under surface of the fuselage of the craft. One form of means for supporting the cabin compartments below the fuselage proper is shown in detail herein, and is preferred by reason of the fact that said means can all be released simultaneously upon the means for ejecting parachute 15 from compartment 14 being rendered operative.

Figures 1, 19:
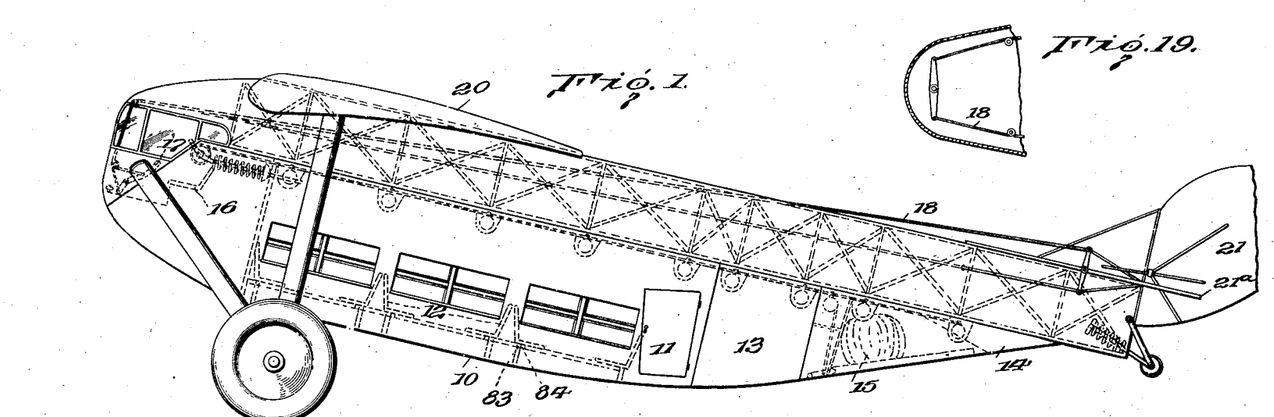
Figure 1 is a side elevation of an airplane, of the monoplane type, having a cabin for the passengers, the illustration being more or less conventional and portions of the interior construction being shown in dotted lines.
Fig. 19 is a detail plan view of the rudder operating connections.
Figure 2:
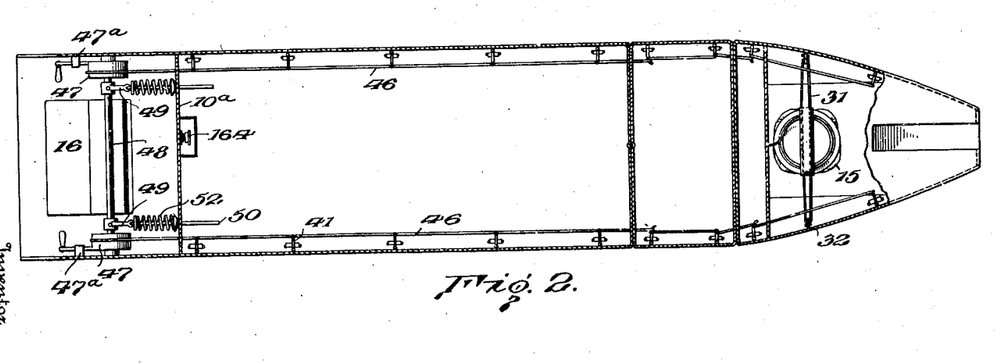
Fig. 2 is a longitudinal sectional view, taken horizontally through the upper portions of the cabin and other compartments.
Figure 3:
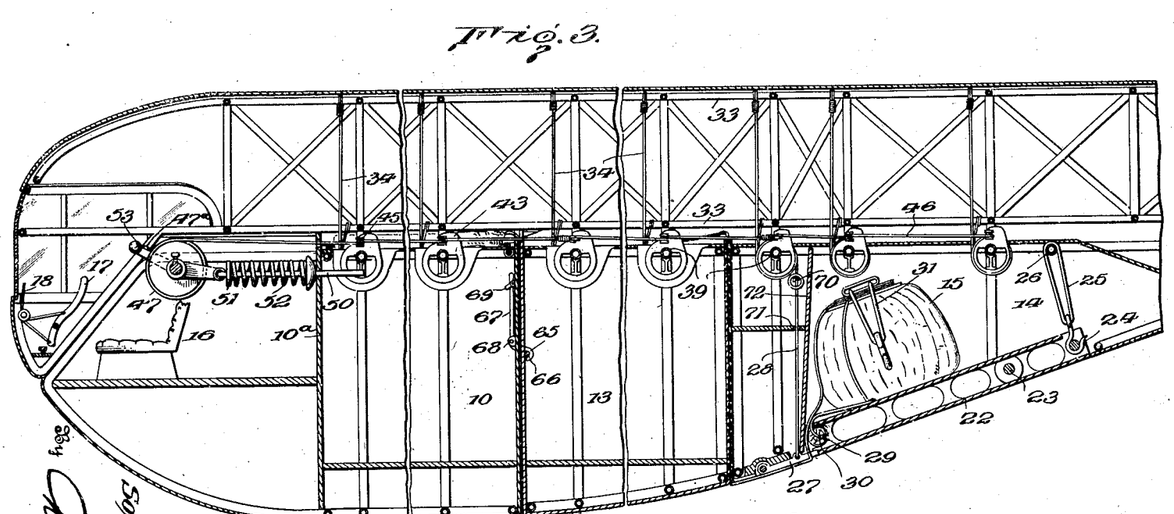
Fig. 3 is a vertical sectional view, longitudinally of the craft, intermediate portions being broken away to reduce the over-all dimension of that portion of the craft illustrated.
Figure 4:
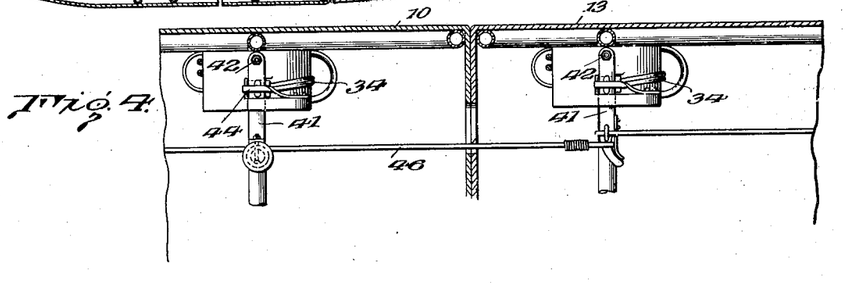
Fig. 4 is a detail plan view, partly in section, of the attaching devices for suspending the several compartments from the fuselage.
Figures 5, 7, 8:
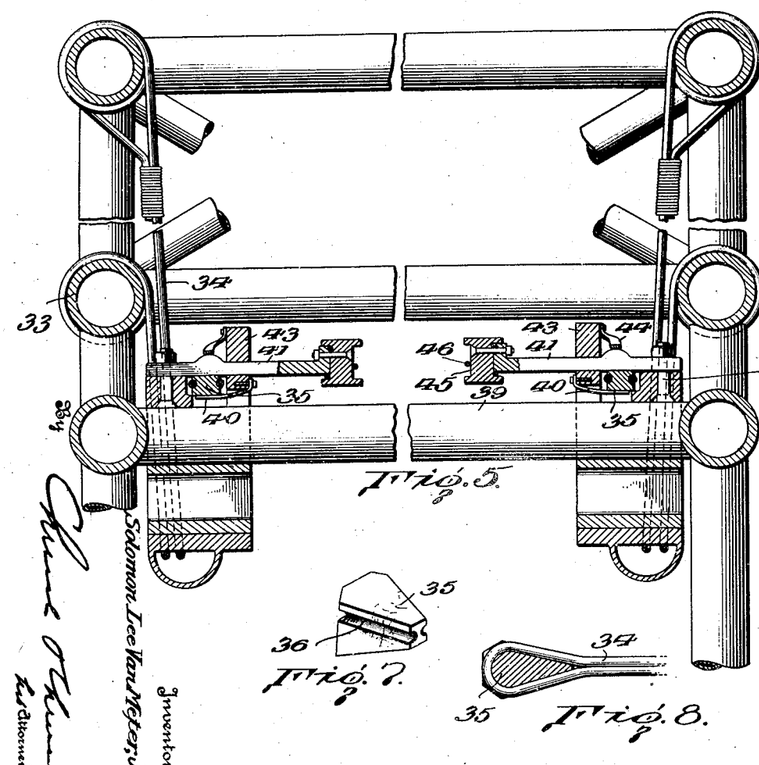
Fig. 5 is a sectional view taken transversely of the craft, illustrating the attaching devices for suspending the compartments from the fuselage.
Figs. 7 and 8 are detail views, illustrating the arrangement for attaching the ends of the suspension members in Figs. 5 and 6.
Figure 6:
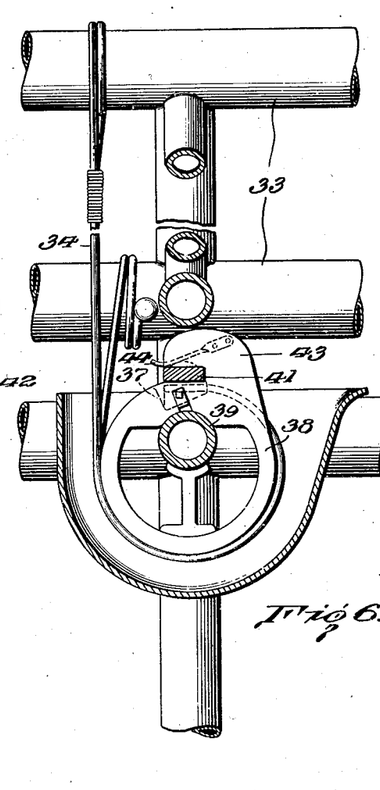
Fig. 6 is a view taken at right angles to Fig. 5 and illustrating the construction shown in that figure.

Referring to Figs. 3 to 8, the bottom of compartment 14 is formed of a pivoted member 22, pivoted at 23, one end of said pivoted member being engaged by a hook 24, to which is attached an elastic element 25 having one end secured at 26 in the upper portion of said compartment. The opposite end of said pivoted bottom 22 is engaged by a latch 27, said latch being normally held in locked position by a cable 28, as will be hereinafter described. In the latched end of pivoted bottom 22 there is a recess 29 in which is normally contained a spring opened pilot parachute 30, connected to the main parachute 15, and upon latch 27 being released, pivoted bottom 22 is turned outwardly from the craft with considerable force, so as to expel or project the pilot parachute 30 outwardly from the craft. At the same time, the main parachute 15 is also projected outwardly from compartment 14 by an elastic member 31, whose end portions are secured to the sides of the compartment by hooks 32 and whose intermediate portion embraces said parachute 15, as shown more in detail in Fig. 10. As shown in detail in Figs. 5 and 6, the cabin and compartments 13 and 14 are detachably connected to the longitudinal members 33 of the fuselage by cables 34. The ends of said cables are permanently attached to said longitudinal members 33, and the intermediate looped portions of the cables embrace a metal button 35, the cable being received in suitably formed recesses 36 in the side of said button. These buttons 35, and the looped portions of cables 34 embracing the same, are normally received in recesses 37 in members 38 assembled on the cross members 39 on the framework of the respective compartments, the buttons being held in position in said recesses by pivoted latch members 41 pivoted at 42 on fixed portions of the several compartments. Each member 38 is provided with a hook shaped portion 43, engaging over its respective latch 41 and a spring 44 on said hook shaped portion engages said latch 41 to yieldingly hold it against movement. The free ends of the several pivoted latch members 41, at respective sides of the cabins, or compartments, are provided with fixed spool-like members 45. The several latches at each side of the several compartments are connected one to the other successively, throughout the length of the craft, so that they may be all turned upon their pivotal pins simultaneously. This connection may consist of a cable 46, or a series of cables, as shown, extending from the rearmost latch 41 to a drum 47 adjacent the pilot seat 16, loops formed in said cable 46 being engaged and fastened around the cylindrical surfaces of spool-like members 45 of the several successive latches 41. It will be understood that there is a cable 46 at each side of the craft, and a drum 47 at each side of the pilot seat 16, all as shown in Fig. 2. The ends of the cables 46 are attached to said drums 47, and mounted on the shaft 48 of said drums are a pair of arms 49. Connected to the free ends of said arms 49 are rods 50, each having a bearing in the end wall 10a of the cabin compartment and between said wall 10a and the collar 51 on each of said rods, there is a spring 52 that is normally held under compression. The drum is held against turning in a clockwise direction by stops 47a as shown in Fig. 3 and the normal position of arms 49 is such that they are below dead center. However, upon rotation of the drum shaft in a counter-clockwise direction by handle levers 53 a distance sufficient to move the arms 49 above dead center, springs 52 become operative to continue such rotation of the drums in a counter-clockwise direction with the result that cables 46 are pulled forwardly and the pivoted latching members 41 withdrawn from the hook-shaped portions 43 of the members 38 and from over the buttons 35. The buttons 35 and the embracing looped portions of the cables 34 are thereby freed from the recesses in which they are otherwise normally locked, their movement out of the recesses being augmented by springs 40, thereby releasing the several compartments from the fuselage of the craft.

Latch line 28 of latch 27 for the bottom of compartment 14 is normally held in a recess in one of the members 38 in a manner corresponding to that in which the members 34 are secured therein, so that at the time said members are released, for the purpose of detaching the several compartments, the latch 27 is simultaneously released, with the result that the pilot parachute and main parachute are both projected outwardly from the craft, as before described. Assuming that a time interval of two seconds is necessary for the opening up of the parachute, it will be seen that with this arrangement the total time interval between the moment when it is decided to abandon the craft, upon the craft getting out of control, and the time that the parachute is opened, for the purpose of taking off the load of the cabin and retarding its descent, is reduced to substantially the two second time limit that is required for the opening of the parachute. In other words, one operation only is required of the pilot for the purpose of freeing the passenger compartment from the fuselage and ejecting both the pilot and main parachutes from their normal place of storage and, as it will be appreciated that the discharge or projection of the parachute from its place of storage is practically instantaneous, the only time limit involved is the opening of the parachute for the purpose of taking up its load.

With this arrangement it will also be observed that although the compartment 13 and compartment 14 normally constitute obstructions at the rear of cabin 10, by releasing or detaching all of the compartments instantaneously from the fuselage, those obstructions are removed so that when the downward movement of the cabin 10 is retarded by the parachute 15, said cabin is free to move rearwardly, relatively to the falling fuselage and substantially parallel to the direction in which the combined bodies are then moving. This is important, because the load lines 54, 55 do not have to be subjected to any strains other than that imposed upon them by the load constituted by the cabin and the occupants thereof. That is, it is not necessary that the cabin move, to any extent, at an angle to the fuselage, as there are no obstructions of any nature whatever in the rear thereof to hinder its rearward motion relatively to the fuselage after it has been released therefrom and its load transmitted to the parachute.

Figure 11:
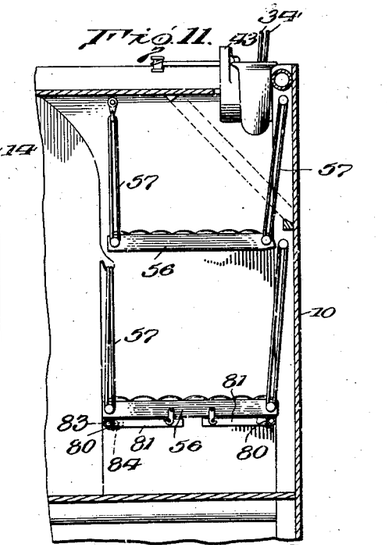
Fig. 11 is a vertical sectional view through a portion of the passenger cabin.

In Fig. 11, there is shown more or less conventionally, one form of sleeping accommodations for the occupants of cabin 10. Such accommodations may consist of upper and lower berths suspended in the cabin by resilient members 57 suitably attached to fixed portions of the cabin. In the day time, the seat cushions 56 are supported on longitudinal bars 80 and the bars are in turn supported by legs 81 hinged thereto. Lateral slipping of the seats on the bars is prevented by cleats 84 while movement of the seats longitudinally of the bars is prevented by cleats 83 engaging projections 84 on said bars. At night time, the hinged seat and seat backs are laid on said bars 80, the hinged legs folded up and the bars suspended on the elastics 57 all as shown in Fig. 11.

Figure 9:
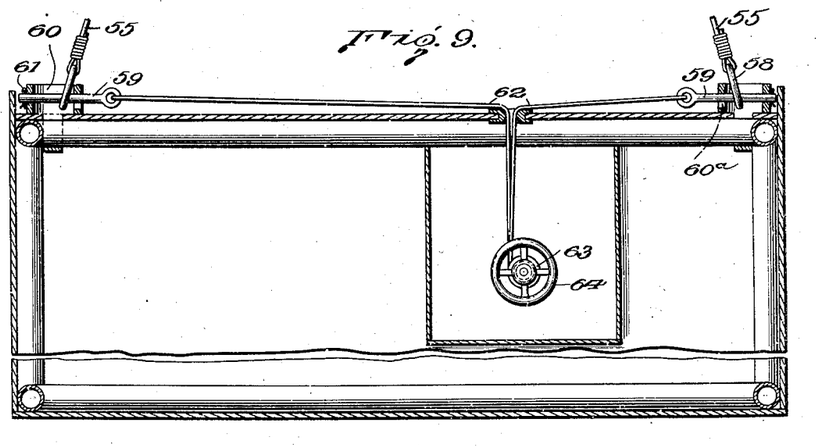
Fig. 9 is a detail view showing the attachment of the parachute load lines to the passenger compartment and the means for releasing said load lines from the compartment.
Figures 12, 13, 14:
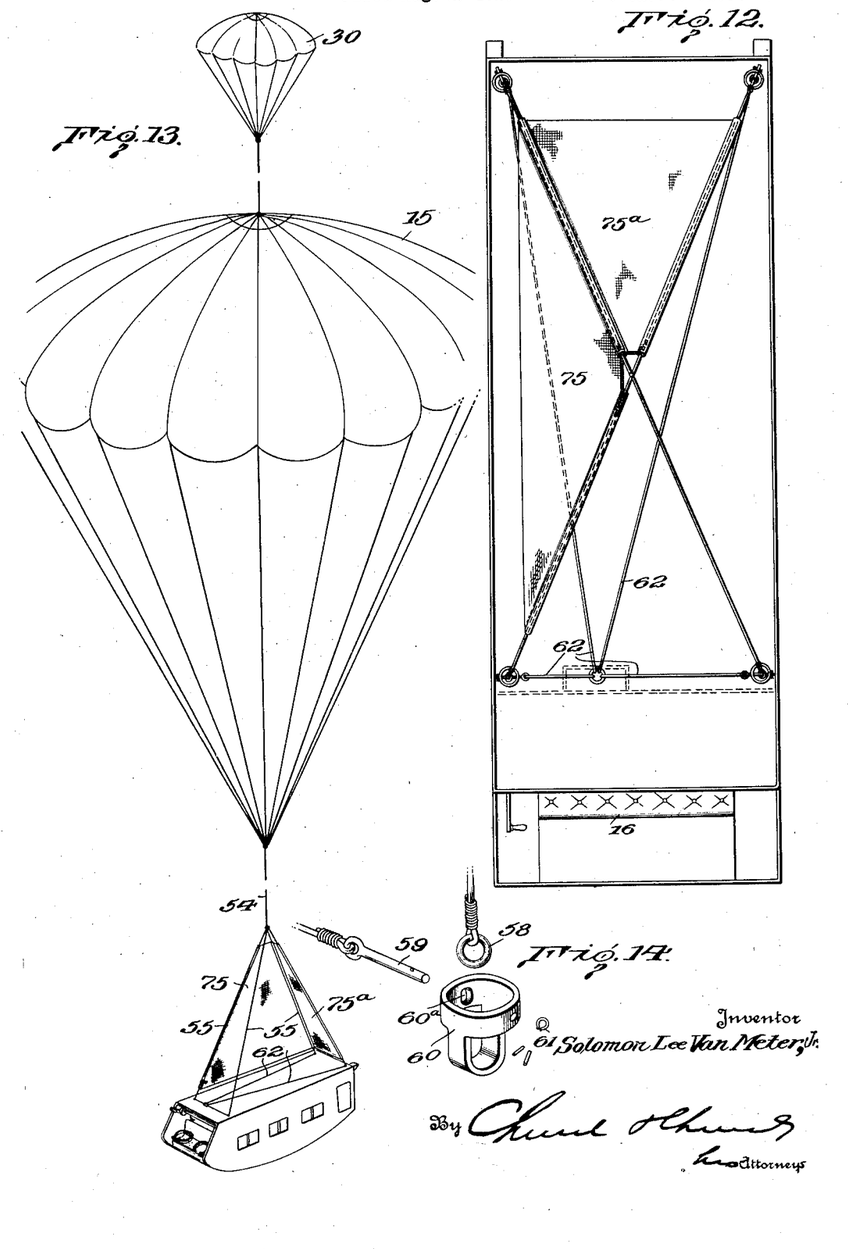
Fig. 12 is a plan view of the devices shown in Fig. 9.
Fig. 13 is a more or less diagrammatical illustration of the passenger cabin being landed by the parachute.
Fig. 14 is a detail view of the connections between the parachute load lines and cabin.
Figures 15, 16, 17, 18:
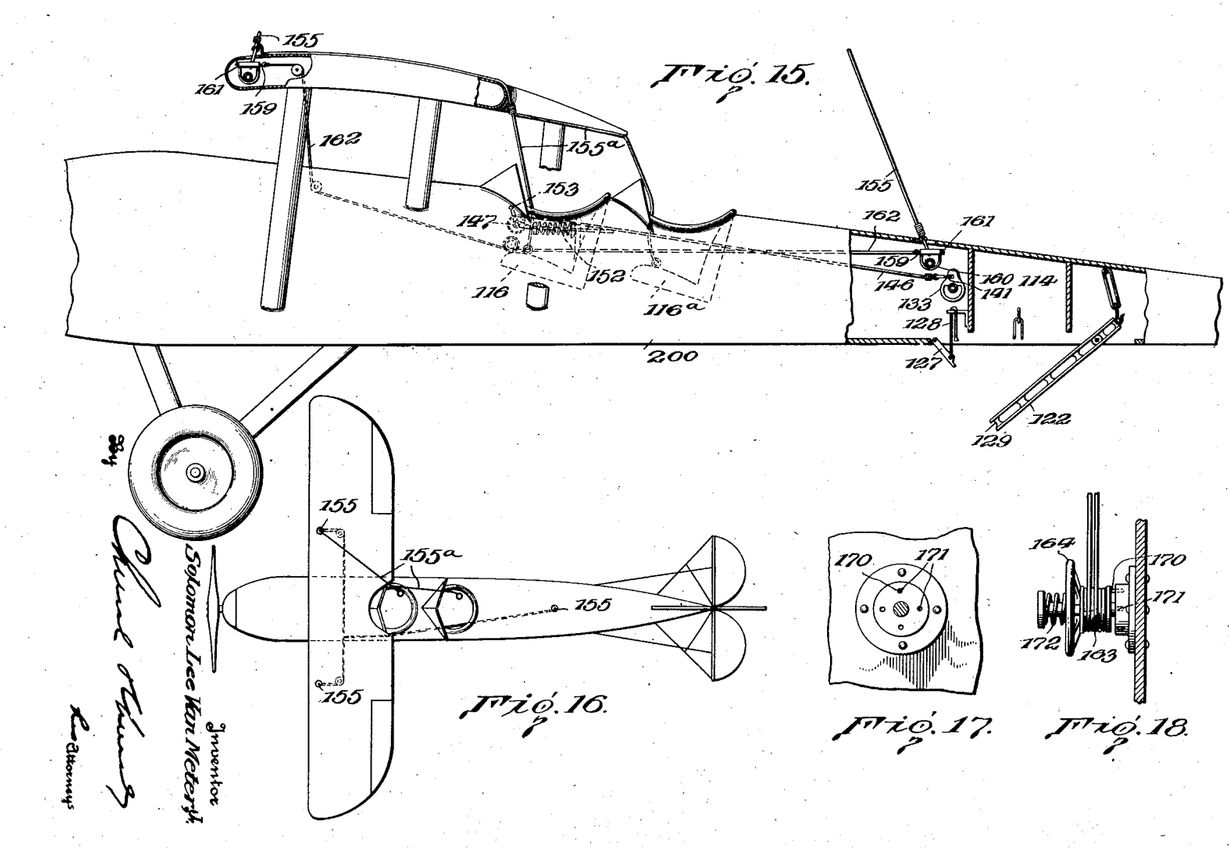
Fig. 15 is a side elevation showing the application of certain features of the present invention to a two-seated plane.
Fig. 16 is a plan view of the plane shown in Fig. 15.
Figs. 17 and 18 are front and side elevations of the means for disconnecting the load lines from the plane in Fig. 15.

As above pointed out, it may, under certain conditions, be desirable to free the parachute from the cabin. For instance, after the cabin has been safely landed, in an emergency, the velocity of the wind might be such that the parachute would actually drag the cabin along the surface of the earth, with possibility of injuring the passengers, or at least certainly making it very uncomfortable for them. To provide for such circumstances, the load lines 55 are detachably secured to the cabin. One form of said detachable connections is shown in Figs. 9, 12, and 14. In this form, the load lines 55 are provided at their ends with ring members 58 through which pins 59 engage, said pins 59 also extending through alined apertures in ring members 60, fixedly secured at the upper surface of the cabin. These pins 59, at one end, are formed with apertures in which cotter pins 61 may be secured, said cotter pins being of such a size that they may be readily severed by the application of a comparatively small pulling force on said pins in an effort to withdraw them from ring members 60. For this purpose, each pin 59 has secured thereto a line 62, said lines terminating in the interior of cabin 10, at which point they are attached to a drum 63 capable of being rotated by a hand wheel 64. With this arrangement, if the occupants within the cabin wish to free the parachute from the cabin, it is only necessary to rotate drum 63 in a direction tending to pull pins 59 out of the ring members 58 and 60. When the proper force is exerted on said pins, the cotter pins 61 will be ruptured or broken and rings 58 in the load lines released. It should also be mentioned at this point that if it is necessary to reduce the load on the parachute, compartment 13, which is normally attached to cabin 10, can be freed or released therefrom by an occupant of the cabin. As shown in Fig. 3, compartment 13 is detachably secured to compartment 10 by one or more hooks 65 engaging the bar 66, the hooks being formed as extensions or handles 67 pivoted in the cabin at 68. The hooks 65 are normally retained in their bar engaging position by rings 69 engaging over the free ends of handle 67, but as will be understood, by lifting the rings 69, the handles 67 may be manipulated to disengage the hooks 65 from said bar. Any number of such hooks 65 may be utilized, but as they will, naturally, be counterparts of each other, only one has been shown in the present instance.

Figure 10:
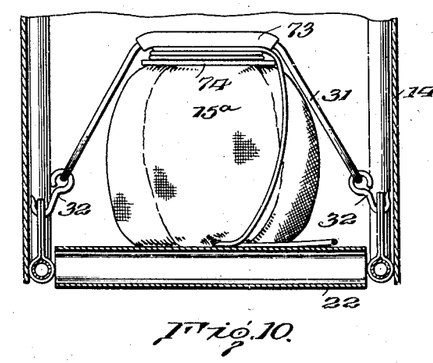
Fig. 10 is a detail view showing the manner in which the main parachute is stored in its compartment.

Certain other more or less minor features might be mentioned. For instance, a ring 70 attached to latch line 28 is somewhat larger than the aperture 71 in the partition 72 so that said latch line cannot fall below the compartment 14 and become entangled with the parachute. As shown in Fig. 10 said parachute is stored in a canvas cover 15a that will readily unfold when the parachute is projected from compartment 14 by the elastic 31. Elastic 31 passes through a piece of flattened aluminum tubing 73, and interposed between said tubing and covering 15a is a light piece of ply wood 74. To prevent pins 59 binding in the holes in members 60, one of said holes is more in the form of a slot as shown at 60a. To reduce the oscillation or swinging of cabin 10 after it has been freed from the fuselage and while it is suspended from the parachute, sails 75, 75a are stretched between the load lines 55 as shown in Fig. 13.

In the type of plane illustrated in Figs. 15 to 18, the parachute is adapted to be stored in the compartment 114, being supported on the pivoted bottom 122 of said compartment. The arrangement for retaining pivoted bottom 122 in parachute supporting position and for projecting said bottom outwardly, as well as the means for projecting the parachute out of its compartment when bottom 122 is opened, is the same in this modified type of plane as in the cabin type. For instance, the latching end of the bottom 122 has a recess 129 therein for the pilot parachute, and said recessed end is engaged by the latch 127, which is releasably held in its normal locked position by one end of cable 128 being secured in the member 133 in the same fashion in which the latch line and cables in the other form of apparatus are held in normally locked position. The member 133 is normally held against movement by latch 141, to which is connected a cable 146 whose forward end is attached to drum 147 forward of the pilot's seat 116. Drum 147 is actuated by handle lever 153 and spring 152, as will be understood from the previous description. It should be mentioned that in Fig. 15, it is assumed that the parachute has been discharged from its compartment so that the plane 200 is suspended therefrom by the load lines 155. In this modification, the load lines are also adapted to be detached from the plane, as in the other type. That is, the lower end of each load line is engaged by a pin 159, held in place by breakable cotter pins 161, pins 159 projecting through coupling members 160, secured to the plane. Connected to the pins 159 are cables 162, these cables extending to a drum 163 adapted to be rotated by hand wheel 164. The drum is normally held against rotation by a pin 170, spring pressed into one of a series of recesses 171, but said pin can be withdrawn from said recess against the tension of spring 172 to permit rotation of the drum. Upon the drum being rotated, the pins 170 are ruptured and the parachute freed. In order that the occupants of the plane may descend with the parachute when the parachute is thus free from the plane, the pilot who occupies seat 116, as well as any passenger that may occupy seat 116a, is adapted to be provided with parachute harness, whereby they may be connected to one of the load lines 155 by auxiliary load lines 155a.

What I claim is:

1. In aircraft, the combination of the fuselage, a passenger cabin detachably secured below said fuselage, a parachute carried by said craft capable of supporting the passenger-carrying cabin, and means for projecting the parachute from the craft, said passenger-carrying cabin being separate from the fuselage but movable substantially parallel to the line of movement of the fuselage when released from the fuselage upon the craft getting out of control and falling by gravity toward the earth.

2. In aircraft, the combination of the fuselage, a series of compartments detachably secured below said fuselage, a parachute supported in one of said compartments and connected to the other compartment, means for simultaneously releasing all of said compartments from the fuselage and for projecting the parachute from its compartment.

3. In aircraft, the combination of the fuselage, a plurality of compartments detachably secured below said fuselage, a parachute supported in one of said compartments and connected to another of said compartments, means for positively ejecting the parachute from its compartment and means for simultaneously releasing all of said compartments from the fuselage and rendering said parachute ejecting means operative.

4. In aircraft, the combination of the fuselage, a passenger cabin detachably supported below the fuselage, and a parachute for retarding descent of said cabin when detached from the fuselage, said cabin being movable relative to the fuselage and in a plane substantially parallel to the direction of the movement of the craft by a retarding effect of said parachute when detached from the fuselage upon the craft getting out of control.

5. In aircraft, the combination of the fuselage, a passenger cabin detachably connected to said fuselage and adapted to move relative to the fuselage in a plane substantially parallel to the direction of movement of the fuselage when said fuselage and cabin are disconnected upon the craft getting out of control and gravitating to earth and a parachute connected to said cabin for retarding the descent thereof when detached from the fuselage.

6. In aircraft, the combination of the fuselage, a passenger compartment detachably secured below the forward portion of the fuselage, a separate compartment detachably connected to the fuselage in rear of said cabin, a parachute in said rear compartment, and a load-line connecting said parachute and passenger compartment, said compartments being adapted to move rearwardly with respect to the fuselage when disconnected therefrom upon the craft getting out of control.

7. In aircraft, the combination of the fuselage, a passenger cabin detachably secured below the forward portion of the fuselage, a separate compartment detachably connected to the fuselage in the rear of said cabin, a parachute in said rear compartment, a load-line connecting said parachute and cabin, means for projecting said parachute from its compartment and means for releasing said cabin and compartment and for rendering said parachute-projecting means operative upon the craft getting out of control, said cabin and compartment being adapted to move rearwardly with respect to the fuselage when disconnected therefrom and when said parachute has been released.

8. In aircraft, the combination of the fuselage, a passenger cabin detachably secured below the forward portion of the fuselage, a communicating compartment detachably associated with both said fuselage and cabin, a second compartment detachably connected to the fuselage in rear of said cabin and communicating compartment, a parachute in said rear compartment, and a load line connecting said parachute and cabin, said cabin and compartments being adapted to move rearwardly with respect to the fuselage when disconnected therefrom upon the craft getting out of control.

9. In aircraft, the combination of the fuselage, a passenger cabin releasably secured below the forward portion of said fuselage and terminating forwardly of the rear end of said fuselage, there being portions of the craft depending below said fuselage and forming obstructions in rear of said cabin, a parachute carried by said craft within said obstructing portions and a load line connecting said cabin and parachute, said obstructions being detachably secured to the fuselage whereby they may be released and the space below the fuselage in rear of said cabin cleared upon the craft getting out of control.

10. In aircraft, the combination of the fuselage, a plurality of compartments below said fuselage, a series of members on said compartments, supporting elements connected to said fuselage and detachably secured to said members, and means for simultaneously releasing all of said elements from said members to free the compartments from said fuselage, said compartments being movable rearwardly of the craft upon release of said elements.

11. In aircraft, the combination of the fuselage, a plurality of compartments below said fuselage, a series of members on said compartments, supporting elements attached to said fuselage, means for securing said supporting elements to said members, and means for simultaneously releasing said elements from said members, said compartments being movable rearwardly of the craft upon release of said supporting elements.

12. In aircraft, the combination of the fuselage, a compartment below said fuselage, a series of members on said compartment, supporting elements attached to said fuselage and said members, a latch engaging each member and the attached portion of the corresponding suspension element to attach the supporting element thereto; and means for simultaneously actuating all of said latches to free the supporting elements from said members, said compartments being movable rearwardly of the craft upon the release of said elements.

13. In aircraft, the combination of the fuselage, a compartment below said fuselage, an anchor member on said compartment, said anchor member having a recess therein, a supporting cable attached at its ends to the fuselage and having an intermediate looped portion engaging in said recess, a latch normally retaining the looped portion of the supporting cable in said recess, and means for actuating said latch to free the suspension element from said recess.

14. In aircraft, the combination of the fuselage, a compartment below said fuselage, an anchor member on said compartment, said anchor member having a recess therein, a suspension element attached to said fuselage, pivoted latching means engaging a portion of said suspension element and retaining it in said recess, means for disengaging said latching means from said element, and means for moving said retained portion of the suspension element out of said recess when said latching means are disengaged therefrom.

15. In aircraft, the combination of the fuselage, a compartment below said fuselage, an anchor member on said compartment, said anchor member having a recess therein, a suspension element attached to said fuselage, latching means for normally retaining a portion of said suspension element in said recess, means for rendering said latching means inoperative, and a spring in said recess engaging the retained portion of the suspension element and tending to project said portion out of said recess.

16. In aircraft the combination of the fuselage, a passenger cabin, said fuselage being adapted to carry the source of power for propelling the craft and the controls for navigating the same, accommodations for a pilot in said cabin, means for detachably supporting said cabin on said fuselage, said cabin being movable rearwardly of the craft upon release from the fuselage and means for landing said cabin safely when detached from the fuselage in an emergency.

17. In aircraft, the combination of the fuselage, a passenger cabin, releasable securing devices for detachably suspending said cabin from the fuselage, a parachute for landing said cabin when detached from the fuselage in an emergency, manually operable means for initially manipulating said securing devices for releasing them, and automatically operable means for completing the release of said devices.

18. In aircraft, the combination of the fuselage, a passenger cabin, said fuselage being adapted to carry the source of power for propelling the craft and the controls for navigating the same, a seat for a pilot in said cabin in proximity to said controls, releasable securing means for detachably supporting said cabin on the fuselage, means for landing said cabin safely when the latter is detached from the fuselage in an emergency, and means operable from the pilot's seat for releasing the cabin from said fuselage.

19. A safety device for landing passengers or cargo from an airplane in flight, comprising a compartment within which passengers or cargo are received, a parachute comprising a canopy and load distributing means extending downwardly therefrom terminating in a localized central point beneath said canopy, means for supporting said compartment from the terminus of said load distributing means consisting of a load cable depending therefrom and a plurality of branch cables radiating outwardly and downwardly from the lower end of said load cable, the lower ends of said branch cable being anchored to and supporting said compartment at spaced points, and means for damping out the tendency of said compartment to be oscillated by said canopy when suspended therefrom, said damping means comprising a pair of vanes mounted upon the top of said compartment in substantially vertical planes disposed at right angles to each other so as to resist and damp out the tendency of said compartment to be swung by said canopy as the latter tilts to spill air.

20. A safety device for landing passengers or cargo from an airplane in flight, comprising a compartment within which passengers or cargo are received, a parachute comprising a canopy and load distributing means extending downwardly therefrom, terminating in a localized central point beneath said canopy, means for supporting said compartment from the terminus of said load distributing means consisting of a load cable depending therefrom and a plurality of branch cables radiating outwardly and downwardly from the lower end of said load cable, the lower ends of said branch cables being anchored to and supporting said compartment at spaced points, and means for damping out the tendency of said compartment to be oscillated by said canopy when suspended therefrom, said damping means comprising a pair of substantially vertical sails or vanes carried directly above said compartment and held extended at substantially right angles to each other by said branch cables so as to resist and damp out the tendency of said compartment to be swung by said canopy as the latter tilts to spill air.

SOLOMON LEE VAN METER, Jr.